United States Patent Office 2,739,875
Patented Mar. 27, 1956

2,739,875

REGENERATION OF DEGRADED ALKYLAN-
THRAQUINONE SOLUTIONS FOR THE PRO-
DUCTION OF HYDROGEN PEROXIDE

Jerome W. Sprauer, Niagara Falls, N. Y., and Thurman V. Williams, Camden, S. C., assignors to E. I. du Pont de Nemours & Company, Wilmington, Del., a corporation of Delaware No Drawing. Application December 6, 1951,
Serial No. 260,336

10 Claims. (Cl. 23—207)

This invention relates to the production of hydrogen peroxide in processes involving the alternate hydrogenation of an alkylanthraquinone and oxygenation of the resulting alkylanthrahydroquinone to regenerate the alkylanthraquinone which is recycled after separation of the hydrogen peroxide formed simultaneously therewith. More particularly, it relates to a method for regenerating the hydrogen peroxide synthesizing capacity of working solutions which have become degraded through use in such a process.

Cyclic processes of the above type employing alkylanthraquinone intermediates dissolved in suitable solvents have previously been proposed. In such processes a solution of the alkylanthraquinone is catalytically hydrogenated and, after separation of the hydrogenation catalyst, the resulting alkylanthrahydroquinone is oxygenated to regenerate the alkylanthraquinone and simultaneously to produce hydrogen peroxide. The hydrogen peroxide is then separated, and the resulting solution of regenerated alkylanthraquinone is recycled to the hydrogenation stage. When the working solution employed comprises the alkylanthraquinone dissolved in a water-immiscible solvent, separation of the hydrogen peroxide is conveniently effected by extraction with water.

Continued recycling of the working solution in such a process results eventually in a substantial degradation of the alkylanthraquinone intermediate with consequent decrease in the peroxide synthesizing capacity of the solution. It has been proposed and generally considered desirable in such processes to convert only part, e. g., about ½, of the anthraquinone content of the working solution to the anthrahydroquinone. Such a procedure reduces but does not eliminate by-product formation representing conversions to inert materials which have no peroxide synthesizing value. Transformation of a minor proportion of the alkylanthraquinone to such inert materials is not immediately critical, since the remaining active alkylanthraquinone is then simply converted more completely to the alkylanthrahydroquinone. However, since conversion to inert materials occurs progressively, continued cyclic operation results in a progressive decrease in the concentration of materials having peroxide synthesizing value with a simultaneous progressive increase in the concentration of by-product materials having no such value. A point is ultimately reached where the amount of hydrogen peroxide which can be made per unit throughput is so small as to make continued use of the solution impractical and replacement of the working solution is required. Since the alkylanthraquinones are relatively expensive, the amount of hydrogen peroxide which can be produced with a given amount of alkylanthraquinone before degradation renders the working solution unfit for continued use, is obviously of considerable importance economically.

In cyclic processes of the above type, there normally occurs a partial conversion of the alkylanthraquinone to the corresponding tetrahydroalkylanthraquinone. The latter behaves similarly to the original alkylanthraquinone in synthesizing hydrogen peroxide in the working cycle and is, therefore, not to be regarded as a degradation product. In contrast with such tetrahydroalkylanthraquinones are other by-products formed in the cyclic process which have no peroxide synthesizing value whatsoever, and it is these which are herein referred to as "degradation products."

The mechanism of the chemical reactions which result in the formation of the above degradation products is not understood. However, the effect of such degradation reactions is readily measured by hydrogenating at 1 atmosphere gas phase hydrogen pressure an aliquot of the working solution in the presence of a suitable hydrogenation catalyst, e. g., palladium on activated alumina, until all alkylanthraquinone materials (including tetrahydroalkylanthraquinones) present are completely converted to the corresponding alkylanthrahydroquinones, separating the catalyst quantitatively, reacting the resulting solution with oxygen until all alkylanthrahydroquinone materials (including tetrahydroalkylanthrahydroquinones) are completely converted to alkylanthraquinones and $H_2O_2$, and determining the amount of $H_2O_2$ so formed. The amount of $H_2O_2$ formed from a given unit of working solution represents the peroxide synthesizing capacity of the working solution. By comparing the synthesizing capacity of the original solution with that of the degraded solution, the extent to which degradation reactions have occurred can be readily determined.

For purposes of the following discussion, including the examples below, the moles of $H_2O_2$ formed in the test described above per mole of "apparent" alkylanthraquinone present in the solution is termed the "effective quinone" content of the solution. The moles of "apparent" alkylanthraquinone (including tetrahydroalkylanthraquinone) present in the solution is calculated by dividing the total non-volatile solid content in the sample by the molecular weight of the alkylanthraquinone initially employed. In freshly prepared working solutions the "apparent" alkylanthraquinone content will be the actual alkylanthraquinone content. However, in degraded solutions the actual alkylanthraquinone (including tetrahydroalkylanthraquinone) content may be substantially less than the apparent content since the latter will include the alkylanthraquinone equivalent of the degraded by-products.

It is an object of the present invention to provide an effective and practical method for regenerating degraded working solutions of the type indicated whereby their hydrogen peroxide synthesizing capacities may be restored or substantially increased. Other objects of the invention will be apparent from the following description.

The above objects are accomplished in accordance with the invention by heating a solution of an alkylanthraquinone which has become degraded to a substantial extent through use in a cyclic hydrogen peroxide synthesis process of the type indicated above, to a temperature of at least 55° C. in the presence of activated alumina or active magnesia. It has been discovered that such a treatment is highly effective in regenerating the peroxide synthesizing capacity of degraded working solutions and that when the treatment is carried out under optimum conditions, the synthesizing capacity even of extensively degraded solutions can be greatly increased. In many instances the capacity can be restored to practically its original value. In such a treatment the activated alumina or active magnesia functions to catalyze the regeneration reaction, or reactions, involved.

The present regeneration treatment can be applied advantageously to working solution from any stage of the cyclic system. However, it is preferably applied to solution which has been oxygenated and then extracted to separate hydrogen peroxide, e. g., to the solution just before it is recycled to the hydrogenator.

Any activated alumina or active magnesia may be employed effectively in practicing the present invention. The term "activated alumina" is used to mean any alumina obtained from natural or synthetic hydrated alumina, which may or may not contain a minor proportion of silica or other materials, by dehydration by heating so as to convert the alumina to a less hydrated form such as alpha-alumina monohydrate or gamma-alumina or the like recognized active forms of alumina. The activating heat treatment should not be sufficient to convert the alumina to the inactive corundum form. Generally, activation is effected by heating at a temperature of 300–800° C. to produce a microporous alumina having extensive surface area. Activated aluminas are well known and are used commercially for many purposes. The term "active magnesia" is used to mean substantially anhydrous magnesia prepared in such manner as to produce a microporous physical form with extensive surface area, e. g., by decomposing magnesium hydroxide, carbonate or nitrate by heating methods. Active magnesias also are well known and commercially available.

In carrying out the present regeneration treatment, it is essential that the working solution be heated to a temperature of at least 55° C. while in contact with the activated alumina or active magnesia. Temperatures within the range 90 to about 150° C. are most effective and are preferred. However, temperatures as low as about 55–60° C. and as high as about 300° C. can be employed if desired. At temperatures below 55° C. regeneration does not occur to any practical extent whereas at temperatures above about 300° C. pyrolytic reactions occur to an excessive extent.

The invention is illustrated by the following examples:

*Example 1*

A working solution initially containing, by weight, about 20% 2-t-butylanthraquinone, 52% 1-methylnaphthalene and 28% diisobutyl carbinol was employed continuously for a period of about 4½ months in a cyclic process for the production of hydrogen peroxide. In the process, the working solution was reacted with hydrogen in the presence of a catalyst comprising palladium supported on activated alumina until about 35–55% of the anthraquinone values were converted to anthrahydroquinones. The catalyst was then filtered from the working solution and the latter was passed to an oxygenator in which it was reacted with oxygen to regenerate the alkylanthraquinone and simultaneously to form hydrogen peroxide. The hydrogen peroxide was separated by extraction with water, after which the working solution was recycled to the hydrogenation stage. Throughout the operation, about 10% of the recycled feed to the hydrogenator was by-passed upwardly through a column of 8 to 48 mesh activated alumina maintained at a temperature of about 110° C. The alumina was replaced with a fresh charge at about 4-week intervals. At the end of 4½ months, the working solution was operating effectively. It then had an "effective quinone" content of 0.73 as compared to an initial value of 0.94. During the operation hydrogen peroxide was produced in an amount corresponding to 29 pounds of $H_2O_2$ per pound of butylanthraquinone charged.

*Example 2*

A working solution containing initially, by weight, about 19% 2-t-butylanthraquinone, 36% 1-methylnaphthalene and 45% diisobutyl carbinol and having an "effective quinone" content of 0.91 was employed substantially as described in Example 1, except that the treatment of part of the recycle solution with activated alumina was omitted. When the "effective quinone" content of the solution had decreased to 0.79, 610 cc. of the working solution from the extractor was recycled for 24 hours at 30 cc. per minute through a bed of 77 g. of activated alumina (4 to 8 mesh size) which contained 0.09% by weight metallic palladium. The bed was maintained at 95 to 100° C. The "effective quinone" content of the treated solution was 0.89.

*Example 3*

A degraded working solution containing 15.4% by weight non-volatile solids, including 2-t-butylanthraquinone, tetrahydro-2-t-butylanthraquinone and by-products obtained therefrom, in a solvent mixture of diisobutyl carbinol and 1-methylnaphthalene in the weight proportions of 30 of the former to 55 of the latter, had an "effective quinone" content of 0.58. This solution had been degraded through use in a cyclic process similar to that of Example 1 except that the treatment with alumina was omitted. Diisobutyl carbinol was stripped from the solution by distillation at 17 mm. pressure and the residual solution was contacted at 100° C. with a column of 48 to 100 mesh activated alumina in the proportion of 2.2 g. of alumina per g. of "solids" in the solution. The solution was passed once through the column at a rate of 2.6 volumes of solution per volume of alumina bed per hour. The column was then rinsed with heptane and the heptane was stripped from the rinsings. The working solution was then reconstituted by adding thereto the residue from the heptane rinsings and the diisobutyl carbinol previously stripped from the solution. The reconstituted solution was found to have an "effective quinone" content of 0.84. The recovery of solids in the treated solution was 88% so that the "effective quinone" content was increased by 27% as a result of the treatment.

*Example 4*

A 25 cc. sample of a degraded working solution similar to that of Example 3 and having an "effective quinone" content of 0.55 was shaken with 5 g. of 48 to 100 mesh activated alumina at 100° C. for 2 hours. The resulting solution had an "effective quinone" content of 0.72.

*Example 5*

A 25 cc. sample of the degraded working solution employed in Example 4 was shaken with 5 g. of 8 to 28 mesh active magnesia at 100° C. for 2 hours. The resulting solution had an "effective quinone" content of 0.74.

*Example 6*

A 25 cc. sample of the degraded working solution employed in Example 4 was shaken with 5 g. of 80 to 200 mesh palladium-on-activated alumina catalyst (containing about 0.6% metallic palladium by weight) at 100° C. for 2 hours. The treated solution had an "effective quinone" content of 0.70.

*Example 7*

The experiment of Example 6 was repeated at a temperature of 60° C. The treated solution had an "effective quinone" content of 0.61.

Example 8

The experiment of Example 6 was repeated at a temperature of 140 to 150° C. The treated solution had an "effective quinone" content of 0.69.

The contact time between the working solution and the alumina or magnesia at the temperatures indicated may be varied considerably, e. g., from periods of time ranging from about 1 minute to 10 hours or more. The time of contact will depend somewhat upon the temperatures employed, longer contact times generally being required at the lower temperatures. Under the preferred temperature conditions, contact times ranging from about 5 minutes to 1 hour generally are adequate.

The action of activated alumina and active magnesia to catalyze the regeneration reaction appears unique since attempts to employ other commonly used contact materials in a similar capacity have demonstrated that silica gel, glass beads, corundum and magnesia obtained by burning magnesium in air were totally ineffective. Synthetic zeolite and bone black were slightly effective but not to any practical extent. These materials were all tested under the conditions described in Example 4.

The particle size of the alumina or magnesia catalyst is not critical and material of any desired particle size may be employed. Material in granular form, e. g., in about 4 to 100 mesh sizes, is preferred.

The proportion of activated alumina or active magnesia to the working solution being regenerated is not especially critical although in batch operations with effective agitation, it generally will be advisable to employ at least 0.5% of the treating agent, based on the weight of the working solution. Generally, 5 to 10% or more of the agent will be found most convenient. Amounts smaller than 0.5% can be used if provision is made for effectively contacting the working solution with the agent and adequate contact times are provided. Much larger quantities than 10% can be employed if desired. When effecting the treatment continuously, e. g., by passing the working solution over or through a bed or column of the contact material, it is only necessary that the dimensions of the bed or column and the rate of passage of the solution therethrough be such as to provide a contact time adequate to give the desired degree of regeneration.

The effectiveness of the alumina or magnesia treating agent decreases with continued use, in view of which periodic replacement thereof is required. Spent material can be effectively revivified by removing retained organic adsorbate, e. g., by extraction with suitable organic solvents, and then replacing the organic solvent by treatment with water. A particularly effective revivification treatment involves washing successively with: (a) heptane; (b) methanol; (c) a hydrochloric acid solution in aqueous methanol; (d) water; (e) dilute aqueous solution of an alkali, e. g., a 0.1 N caustic solution; and finally, (f) with water. The washed material is then dried, e. g., at 100°–110° C., prior to its reuse.

The foregoing examples have shown by way of illustration the regeneration of working solutions containing 2-t-butylanthraquinone dissolved in a solvent mixture comprising 1-methylnaphthalene and diisobutyl carbinol. Working solutions comprising other alkylanthraquinones, e. g., ethyl-, methyl-, propyl-, isopropyl-anthraquinones and the like, and other solvents such as mixtures of benzene with higher alcohols, can be regenerated effectively in the same manner. Similarly, it is not important what hydrogenation catalyst is employed in the hydrogenation stage, or what conditions are employed in carrying out any of the various phases of the cyclic process. Degraded working solutions obtained in the practice of such processes under any of the conditions heretofore proposed can be effectively regenerated by the present method.

The regeneration treatment can be carried out either batchwise or continuously. A particularly preferred procedure involves continuously treating a portion, e. g., about 10% of the working solution recycle stream from the extractor by heating it to at least 55° C. in the presence of granular activated alumina or active magnesia. The alumina- or magnesia-treated stream is then fed continuously to the hydrogenator along with the remaining portion of the recycle stream. In this manner progressive build up of degradation products in the working solution is continuously avoided.

Another procedure which may at times be preferred is to apply the present regeneration treatment to degraded working solution from which all alcohol solvent constituents have been previously removed so that only hydrocarbon solvents remain. The working solution is then reconstituted by re-adding the alcohol solvent constituent. Alcohols are strongly adsorbed by the alumina and magnesia treating agents so that their presence decreases the capacity of the agent to adsorb undesired impurities which may be present. In the absence of alcohols, the alumina or magnesia treatment not only effects regeneration of degradation by-products, but also effectively removes undesired impurities by adsorption so that regeneration and purification are simultaneously achieved. However, the purifying action is incidental and entirely unrelated to the regeneration effect.

The behavior of a degraded working solution in the present regeneration treatment will depend somewhat upon its previous history. A solution which has been severely degraded by long continuous use will contain more degradation products than one which has been used for a shorter period of time, or one which has been periodically or continuously regenerated in whole or in part. There is some evidence that the more severely a solution is degraded the less completely can it be ultimately regenerated. However, even in the most unfavorable cases encountered, a substantial degree of regeneration was obtained by the present treatment.

Examples 2, 6, 7 and 8 show regenerations employing activated alumina containing metallic palladium. However, the presence of palladium on the activated alumina is not essential. Metallic palladium supported on activated alumina, e. g., the material employed in Example 2, is a very effective hydrogenation catalyst for the hydrogenation stage. However, even though such a catalyst is employed in the hydrogenation stage, it is not effective in that operation for regenerating degradation products, because the temperatures normally employed in the hydrogenation stage are too low for the present purposes.

We claim:

1. A method of regenerating a degraded solution comprising an alkylanthraquinone dissolved in a solvent therefor, which solution has become degraded through use in a process for synthesizing hydrogen peroxide involving alternately hydrogenating said alkylanthraquinone and oxygenating the resulting alkylanthrahydroquinone which is recycled after separation of the hydrogen peroxide simultaneously formed, said method comprising heating said degraded solution at a temperature of at least 55° C. in the presence of an agent from the group consisting of activated alumina and active magnesia.

2. The method of claim 1 wherein the temperature is 90 to 150° C.

3. The method of claim 1 wherein said agent is activated alumina.

4. The method of claim 1 wherein said agent is active magnesia.

5. The method of claim 1 wherein the working solution contains an alcohol solvent constituent and a hydrocarbon solvent constituent and wherein said alcohol constituent is removed before the solution is heated in the presence of said agent.

6. The method of claim 5 wherein the working solution is reconstituted by re-adding the alcohol constituent after the solution has been heated in the presence of said agent.

7. In a method of producing hydrogen peroxide wherein a solution comprising an alkylanthraquinone dissolved in a suitable solvent is alternately hydrogenated and the resulting solution of an alkylanthrahydroquinone is oxygenated to regenerate said solution of said alkylanthraquinone which is recycled after separation of the hydrogen peroxide simultaneously formed, the improvement comprising heating of a portion of said recycle solution before it is passed to the hydrogenation stage to a temperature of 55 to 300° C. in the presence of an agent from the group consisting of activated alumina and active magnesia.

8. The method of claim 7 wherein the temperature is 90 to 150° C.

9. The method of claim 7 wherein said agent is activated alumina.

10. The method of claim 7 wherein said agent is active magnesia.

References Cited in the file of this patent

UNITED STATES PATENTS

| | | |
|---|---|---|
| 2,059,569 | Filson et al. | Nov. 3, 1936 |
| 2,537,655 | Dawsey et al. | Jan. 9, 1951 |